United States Patent
Won et al.

(10) Patent No.: US 9,620,018 B2
(45) Date of Patent: Apr. 11, 2017

(54) APPARATUS AND METHOD FOR CONTROLLING LANE KEEPING OF VEHICLE

(71) Applicant: HYUNDAI MOTOR COMPANY, Seoul (KR)

(72) Inventors: Young Deok Won, Gyeonggi-do (KR); Si U Yang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 41 days.

(21) Appl. No.: 14/717,041

(22) Filed: May 20, 2015

(65) Prior Publication Data

US 2016/0107597 A1 Apr. 21, 2016

(30) Foreign Application Priority Data

Oct. 17, 2014 (KR) ........................ 10-2014-0140722

(51) Int. Cl.
*B60Q 1/00* (2006.01)
*G08G 1/16* (2006.01)
*B62D 1/00* (2006.01)

(52) U.S. Cl.
CPC ............... *G08G 1/167* (2013.01); *B62D 1/00* (2013.01)

(58) Field of Classification Search
CPC ................................ B62D 1/00; B60W 10/00
See application file for complete search history.

(56) References Cited

U.S. PATENT DOCUMENTS

| 2013/0190986 A1* | 7/2013 | Nishimori | ................ B62D 6/00 701/41 |
| 2014/0277945 A1* | 9/2014 | Chandy | .................... B62D 6/00 701/42 |
| 2014/0371992 A1* | 12/2014 | Di Cairano | ............ B62D 6/008 701/42 |

FOREIGN PATENT DOCUMENTS

| JP | 2007-112316 | 5/2007 |
| JP | 2009-280077 | 12/2009 |
| JP | 2011-70550 | 4/2011 |
| JP | 2012-131466 | 7/2012 |
| JP | 5444764 | 3/2014 |
| JP | 2014-196039 | 10/2014 |
| KR | 10-2009-0083910 | 8/2009 |
| KR | 10-2011-0101599 | 9/2011 |

* cited by examiner

*Primary Examiner* — Shirley Lu
(74) *Attorney, Agent, or Firm* — Brinks Gilson & Lione

(57) ABSTRACT

The present disclosure relates to an apparatus and a method for controlling lane keeping of a vehicle. An apparatus for controlling lane keeping of a vehicle may include: a sensor module configured to measure a torque value of a vehicle; a control module configured to determine a hands off state based on the measured torque value and generate a warning alarm for the hands off state when the vehicle is in the hands off state and is in a predetermined specific state; and an output module configured to generate the warning alarm.

8 Claims, 3 Drawing Sheets

APPARATUS AND METHOD FOR CONTROLLING LANE KEEPING OF VEHICLE

CROSS-REFERENCE TO RELATED APPLICATION

This application claims the benefit of Korean Patent Application No. 10-2014-0140722, filed on Oct. 17, 2014, the entirety of which is hereby incorporated by reference.

TECHNICAL FIELD

The present disclosure relates to an apparatus and a method for controlling lane keeping of a vehicle, and more particularly, to an apparatus and a method for controlling lane keeping of a vehicle capable of providing a non-contact alarm of a steering handle only when a driving vehicle is in predetermined specific situations.

BACKGROUND

A lane keeping assist system is a system for automatically controlling a vehicle to prevent the vehicle from deviating from a lane while the vehicle is driven and is a technology of informing a driver of a case in which the vehicle deviates from the lane using an alarm such as a vibration of a steering handle or an alarm sound and automatically steering a steering handle to keep a lane.

The lane keeping assist system as described above provides a hands off sensing function which outputs a warning alarm when a driver does not hold a steering handle. However, the hands off sensing function determines the state in which the driver does not hold the steering handle, for example, the state in which the driver lays his/her hand on the steering handle, and the like as the hands off state to output the warning alarm, which leads to a reduction in concentration of the driver while driving.

SUMMARY

The present disclosure provides an apparatus and a method for controlling lane keeping of a vehicle capable of outputting a hands off warning alarm in predetermined specific situations such as a situation in which a lane keeping assist system is operated while a vehicle is driven or a situation in which the vehicle approaches a lane.

According to an exemplary form of the present disclosure, an apparatus for controlling lane keeping includes: a sensor module configured to measure a torque value of a vehicle; a control module configured to determine a hands off state based on the measured torque value and generate a warning alarm for the hands off when the vehicle is in the hands off state and is in a predetermined specific state; and an output module configured to output the warning alarm.

The specific state may be at least one of an enabling state of a lane keeping assist system (LKAS) and a state in which a driving lane of the vehicle approaches a lane on a road over a threshold value.

The controller may further include a camera acquiring an image data for a lane on a driving road.

The controller may analyze the image data to confirm a distance between a lane on the road and the vehicle.

The controller may confirm the hands off based on a torque value for a force applied to a steering handle which is equipped in the vehicle, a torque value which is lost due to a distance between the steering handle and a shaft driving a wheel equipped in the vehicle, and a torque value consumed by a friction force between the wheel and the road.

According to another exemplary form of the present disclosure, a method for controlling lane keeping includes: confirming a torque value of a driving vehicle; confirming a hands off based on the confirmed torque value; confirming whether the vehicle is in the hands off state and is in a predetermined specific state; and generating and outputting a warning alarm for the hands off when the vehicle is in the specific state.

In the confirming whether the vehicle is in the predetermined specific state, at least one of an enabling state of a lane keeping assist system (LKAS) and a state in which a driving lane of the vehicle approaches a lane on a road over a threshold value may be confirmed.

The confirming whether the vehicle is in the predetermined specific state may include: acquiring an image data for a lane on a road on which the vehicle is driven; and confirming whether the vehicle is in a predetermined specific state to confirm whether the driving lane of the vehicle approaches the lane on the road over the threshold value.

In the confirming whether the vehicle is in the hands off state, the hands off state may be determined based on a torque value for a force applied to a steering handle which is equipped in the vehicle, a torque value which is lost due to a distance between the steering handle and a shaft driving a wheel equipped in the vehicle, and a torque value consumed by a friction force between the wheel and the road.

BRIEF DESCRIPTION OF THE DRAWINGS

In order that the disclosure may be well understood, there will now be described various forms thereof, given by way of example, reference being made to the accompanying drawings, in which.

Figure 1:
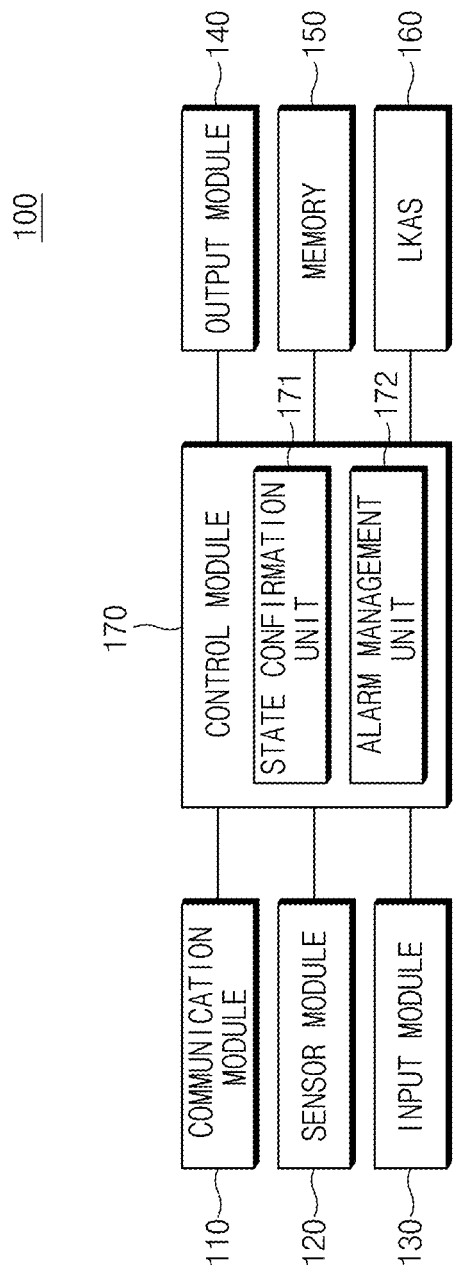
FIG. 1 is a block diagram illustrating main components of an apparatus for controlling lane keeping of a vehicle according to an exemplary form of the present disclosure.

The drawings described herein are for illustration purposes only and are not intended to limit the scope of the present disclosure in any way.

DETAILED DESCRIPTION

Hereinafter, various exemplary forms of the present disclosure will be described with reference to the accompanying drawings. The exemplary forms of the present disclosure may be variously changed and variously practiced, but specific exemplary forms are illustrated in the accompanying drawings and detailed contents thereof will be described. However, it is to be understood that various exemplary forms of the present disclosure are not limited to the specific exemplary forms, but include all modifications, equivalents, and substitutions included in the spirit and the scope of the present disclosure. In describing the drawings, corresponding reference numerals indicate like or corresponding parts and features.

FIG. 1 is a block diagram illustrating main components of an apparatus for controlling lane keeping of a vehicle according to an exemplary form of the present disclosure.

Figure 2:
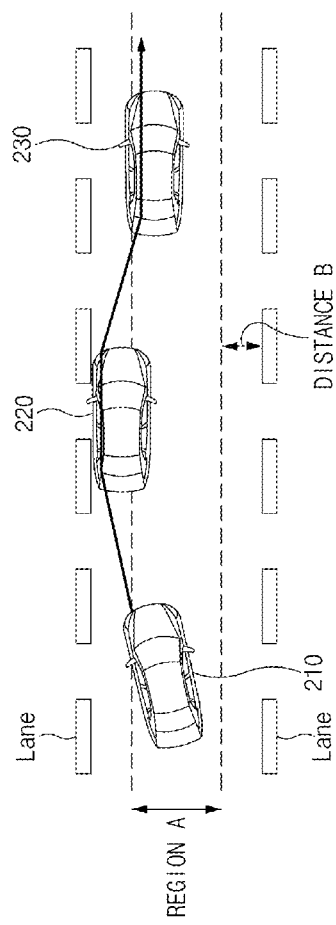
FIG. 2 is a diagram for describing a method for controlling lane keeping of a vehicle according to an exemplary form of the present disclosure.

FIG. 2 is a diagram for describing a method for controlling lane keeping of a vehicle according to an exemplary form of the present disclosure.

Referring to FIGS. 1 and 2, an apparatus 100 (hereinafter, referred to as a control apparatus) for controlling lane keeping according to an exemplary form of the present disclosure may include a communication module 110, a sensor module 120, an input module 130, an output module 140, a memory 150, a lane keeping assist system (LKAS) 160, and a control module 170. The control apparatus 100 according to the exemplary form of the present disclosure may be an apparatus such as a navigation and an around view monitor (AVM) which are equipped in the vehicle.

The communication module 110 may perform various intra-vehicle communications such as a controller area network (CAN), a CAN with flexible data rate (CAN-FD), FlexRay, a media oriented systems transport (MOST), and a time triggered Ethernet (TT Ethernet) for communication among the sensor module 120, the input module 130, the output module 140, the memory 150, the LKAS 160, and the control module 170.

The sensor module 120 is equipped in the vehicle to measure driving information of a vehicle and provide the measured driving information to the control module 170 through the communication module 110. The sensor module 120 may include a torque sensor capable of confirming a torque value of a vehicle, an image sensor for photographing image data for a road of the vehicle while driving, etc.

The input module 130 may generate a control signal depending on an input from the outside. To this end, the input module 130 may be formed as input devices such as a keypad, a touch pad, and a touch screen and when the input module 130 is formed as a touch screen, the input module 130 may also serve as the output module 140.

The output module 140 may include output apparatuses (not illustrated) such as an LCD and a touch screen to output the image data acquired by a camera and a speaker (not illustrated) for outputting a warning alarm associated with the lane keeping of a driving road.

The memory 150 may store programs, and the like for operating the control apparatus 100.

The LKAS 160 may control the driving of the vehicle so that the driving vehicle keeps a distance from a lane on a road by the control of the control module 170.

The control module 170 may determine a hands off state based on a torque value measured by the sensor module 120 and confirm whether the vehicle satisfies a predetermined specific state under the hands off state. When the vehicle satisfies the predetermined specific state, the control module 170 may generate a warning alarm for the hands off and output the generated warning alarm through the output module 140. For this purpose, the control module 170 may include a state confirmation unit 171 and an alarm management unit 172.

The state confirmation unit 171 may determine the hands off state based on the torque value provided from the sensor module 120. In this case, the hands off state may mean the state in which the driver takes his/her hand off the steering handle. The state confirmation unit 171 may receive the torque value confirmed by the sensor module 120, for example, a torque value TQ1 for a force applied to the steering handle. The state confirmation unit 171 may be connected with the steering handle depending on an operation of the steering handle to substantially calculate a torque value TQ2 which is lost due to a distance up to a shaft driving a vehicle wheel. The state confirmation unit 171 may calculate a torque value TQ3 which is consumed by a friction force between a wheel which is substantially driven by the operation of the steering handle and a road. The state confirmation unit 171 may calculate a final torque value using TQ1+TQ2−TQ3 or TQ1−TQ2−TQ3 based on the position of the torque sensor for sensing the torque value depending on the operation of the steering handle. The state confirmation unit 171 determines the hands off state when the calculated final torque value is equal to or less than a threshold value.

The state confirmation unit 171 may confirm the state of the vehicle when the hands off state is kept for a threshold time. The state confirmation unit 171 may provide the state confirmation result to an alarm management unit 172 when the hands off state is kept for the threshold time, and when the vehicle satisfies both a first state and a second state, or the vehicle satisfies any one of the first state and the second state. In this case, the first state may be a state in which the LKAS 160 is enabled and the second state may be a state in which the vehicle approaches a lane over a threshold value.

Referring to FIG. 2, the state confirmation unit 171 may determine that the vehicle does not satisfy the second state since the vehicle is positioned in region A, that is, a threshold distance (distance B) from the lane, for example, 30 cm when the vehicle is driven in state 210 in the hands off state. The state confirmation unit 171 may determine that the vehicle satisfies the second state since the distance between the lane and the vehicle is in a threshold distance (distance B) when the driving state of the vehicle is changed to state 220. The state confirmation unit 171 may provide the state confirmation result to the alarm management unit 172 when the vehicle satisfies the second state. The state confirmation unit 171 may determine that the vehicle does not satisfy the second state when the driving state of the vehicle is changed to state 230.

The alarm management unit 172 may generate a warning alarm through the output module 140 based on the state confirmation result provided from the state confirmation unit 171. When the LKAS 160 is in an enabled state, the LKAS 160 may control the wheel of the vehicle to keep a predetermined interval from a lane on a road on which a vehicle is driven.

Figure 3:
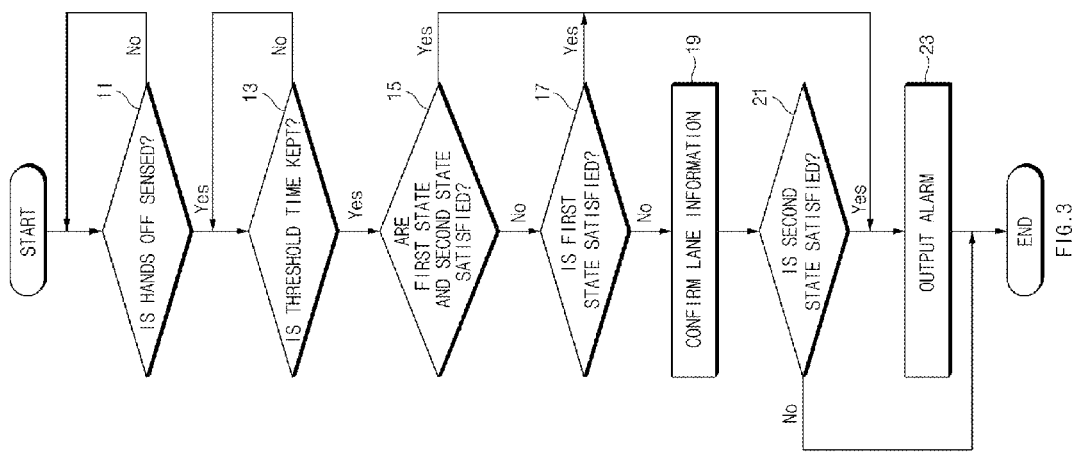
FIG. 3 is a flow chart for describing the method for controlling lane keeping of a vehicle according to the exemplary form of the present disclosure.

FIG. 3 is a flow chart for describing the method for controlling the lane keeping of a vehicle according to the exemplary form of the present disclosure.

Referring to FIGS. 1 to 3, in step 11, when the control module 170 confirms the hands off state, the control module 170 performs step 13, and when the control module 170 does not confirm the hands off state, the control module 170 may continue to determine if the vehicle is in the hands off state. According to the exemplary form of the present disclosure, the control module 170 may receive the torque value of the driving vehicle to determine the hands off state. The control module 170 may calculate the torque value TQ1 for the force applied to the steering handle. The control module 170 may be connected with the steering handle depending on the operation of the steering handle to substantially calculate the torque value TQ2 which is lost due to a distance up to a shaft driving a vehicle wheel. The control module 170 may calculate the torque value TQ3 which is consumed by the friction force between the wheel which is substantially driven by the operation of the steering handle and a road. The control module 170 may calculate the final torque value using TQ1+TQ2−TQ3 or TQ1−TQ2−TQ3 based on the position of the torque sensor for sensing the torque value depending on the operation of the steering handle. The control module 170 may confirm the hands off state when the calculated final torque value is equal to or less than the threshold value.

In step 13, the control module 170 may calculate how long the hands off state is kept. When the period of time of the hands off state passes the threshold time, the control module 170 proceeds to step 15, and if not, it may continuously monitor whether the time of hands off passes the threshold time In step 15, the control module 170 may confirm the state of the vehicle of which the hands off is sensed to proceed to step 23 when the vehicle satisfies both of the first state and the second state. In step 23, the control module 170 may generate and output the warning alarm informing the hands off.

The control module 170 may proceed to step 17 when the state of the vehicle does not satisfy both of the first state and the second state. In step 17, the control module 170 determines whether the state of the vehicle satisfies the first state. In this case, the first state may mean that the LKAS is in enabled state. In step 17, the control module 170 may proceed to step 23 when the LKAS is in the enabled state to generate and output the warning alarm informing the hands off.

The control module 170 may proceed to step 19 when the state of the vehicle does not satisfy the first state. In step 19, the control module 170 may confirm lane information. The control module 170 may analyze the image data for the driving road acquired by the camera to confirm the position of the vehicle and the position of the lane. In step 21, the control module 170 determines whether the vehicle satisfies the second state based on the position of the vehicle and the position of the lane which are confirmed. The control module 170 proceeds to step 23 when the vehicle may satisfy the second state to generate and output the warning alarm informing the hands off and may end the process when the vehicle does not satisfy the second state. In this case, satisfying the second state may mean the state in which the driving vehicle approaches the lane over the threshold value. For example, it may be recognized that when the vehicle approaches the lane as much as about 30 cm, the vehicle satisfies the second state.

The exemplary form of the present disclosure discloses that when the vehicle does not satisfy any one of the first state and the second state, the process ends, but is not necessarily limited thereto and therefore may continuously perform the above processes when the starting of the vehicle is turned off.

According to the exemplary forms of the present disclosure, it is possible to provide the apparatus and method for controlling the lane keeping of a vehicle capable of preventing the reduction in concentration of the driver while driving by outputting the hands off warning alarm only in the predetermined specific situations such as the situation in which the lane keeping assist system is operated while the vehicle is driven or the situation in which the vehicle approaches a lane.

The exemplary forms of the present disclosure disclosed in the present specification and the accompanying drawings have been provided only as specific examples in order to assist in understanding the present disclosure and do not limit the scope of the present disclosure. Therefore, it is to be understood that in addition to the exemplary forms of the present disclosure described herein, all the changed or modified forms derived from the technical spirit of the present disclosure are included in the scope of the present disclosure.

What is claimed is:

1. An apparatus for controlling lane keeping of a vehicle, comprising:
    a sensor module configured to measure a torque value of the vehicle;
    a control module configured to determine a hands off state based on the measured torque value and generate a warning alarm for the hands off state when the vehicle is in the hands off state and in a predetermined specific state; and
    an output module configured to output the warning alarm,
    wherein the control module is configured to determine that the predetermined specific state occurs when the vehicle is within a predetermined distance of a lane on a driving road.

2. The apparatus according to claim 1, wherein the control module includes a camera acquiring an image data for a lane on the driving road.

3. The apparatus according to claim 2, wherein the control module analyzes the image data to confirm a distance between a lane on the driving road and the vehicle.

4. The apparatus according to claim 1, wherein the control module confirms the hands off state based on a torque value for a force applied to a steering handle which is equipped in the vehicle, a torque value which is lost due to a distance between the steering handle and a shaft driving a wheel equipped in the vehicle, and a torque value consumed by a friction force between the wheel and the driving road.

5. A method for controlling lane keeping of a vehicle, comprising:
    calculating by a control module a torque value of a driving vehicle measured by a sensor module;
    determining by the control module a hands off state based on the calculated torque value;
    determining by the control module whether the vehicle is in the hands off state and is in a predetermined specific state;
    determining by the control module whether a lane keeping assist system is unavailable; and
    generating and outputting from the control module a warning alarm for the hands off state to an output module when the vehicle is within a predetermined distance of a lane on a driving road.

6. The method according to claim 5, wherein whether the vehicle is within in the predetermined distance of the lane on the driving road is determined by:
    acquiring an image data of the lane on the driving road on which the vehicle is driven; and
    confirming a position of the vehicle and a position of the lane from the acquired image data.

7. The method according to claim 5, wherein in determining whether the vehicle is in the hands off state, the hands off state is confirmed based on a torque value for a force applied to a steering handle which is equipped in the vehicle, a torque value which is lost due to a distance between the steering handle and a shaft driving a wheel equipped in the vehicle, and a torque value consumed by a friction force between the wheel and the driving road.

8. A lane keeping apparatus for a vehicle, the apparatus comprising:
    a sensor module configured to measure a torque value of the vehicle; and
    a control module configured to determine when a hands off state occurs based on a calculated torque value and to receive a state signal of a lane keeping assist system, the control module further configured to calculate a distance between the vehicle and a lane on a road on which the vehicle is running, wherein when the hands off state occurs for more than a predetermined amount of time, the control module is configured to send an alarm to an output module under at least one of a condition that the lane keeping assistant system is enabled or a condition that the calculated distance between the lane and the vehicle is shorter than a predetermined distance, and wherein the control module is configured to determine whether to send the alarm when the lane keeping assist system is unavailable.

\* \* \* \* \*